March 22, 1966     D. E. WURSTER ETAL     3,241,520
PARTICLE COATING APPARATUS
Filed Oct. 19, 1964     5 Sheets-Sheet 1
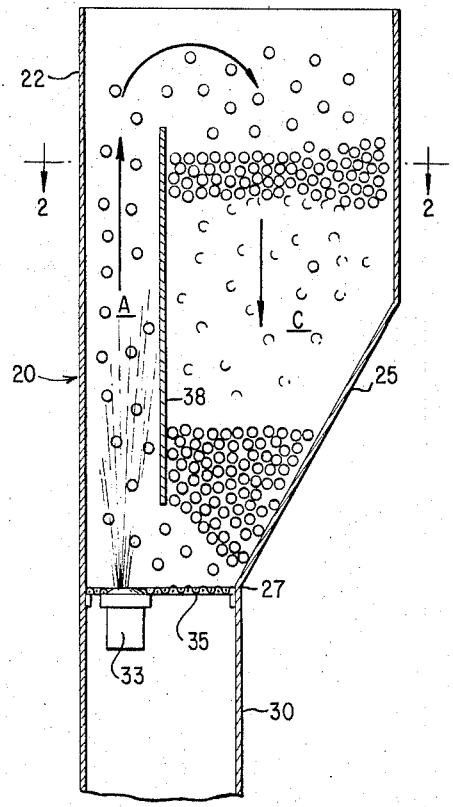
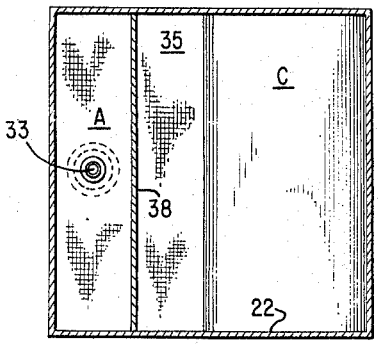
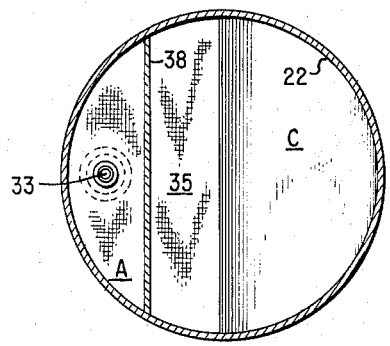
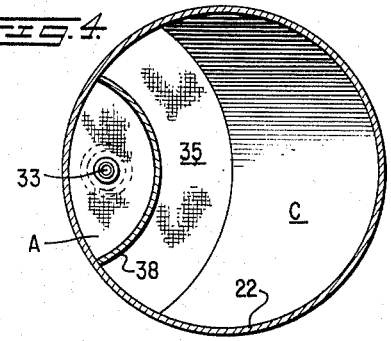
INVENTORS.
JAMES A. LINDLOF
DALE E. WURSTER
BY *Adams, Forward & McGee*
ATTORNEYS.

March 22, 1966  D. E. WURSTER ETAL  3,241,520
PARTICLE COATING APPARATUS
Filed Oct. 19, 1964  5 Sheets-Sheet 2
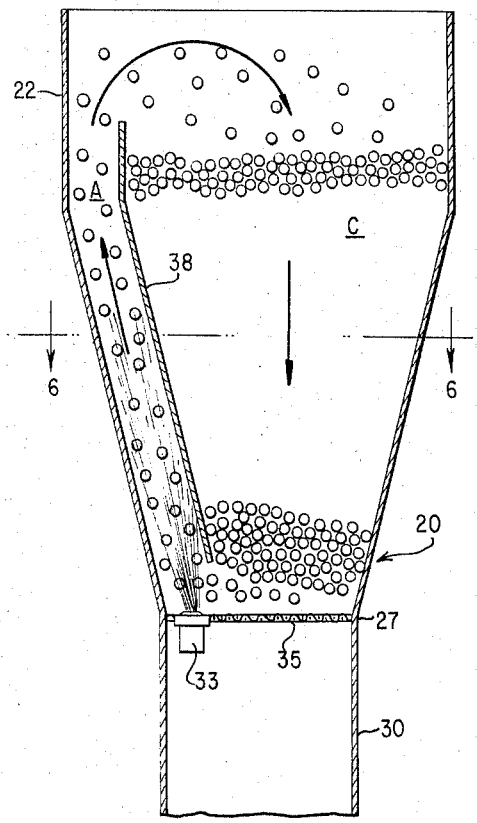
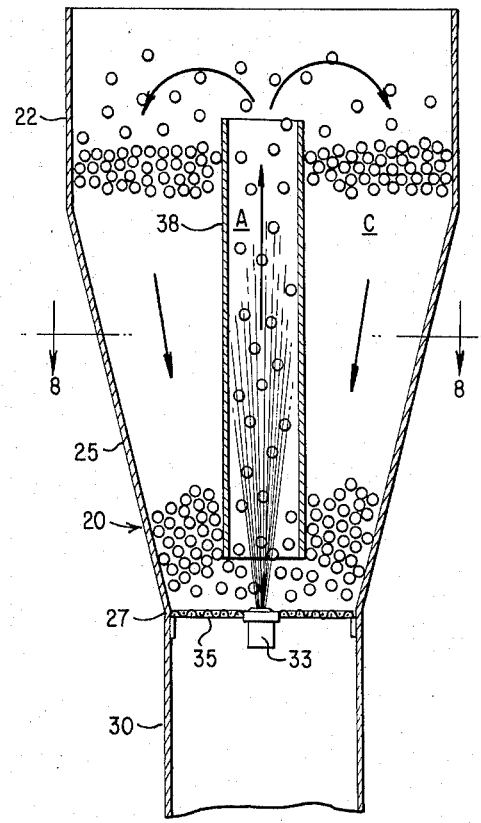
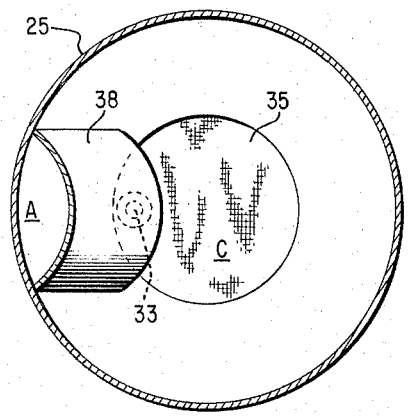
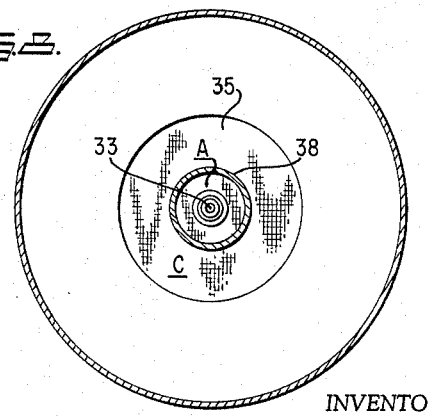
INVENTORS.
JAMES A. LINDLOF
DALE E. WURSTER
BY
ATTORNEYS March 22, 1966     D. E. WURSTER ETAL     3,241,520
PARTICLE COATING APPARATUS
Filed Oct. 19, 1964     5 Sheets-Sheet 3

INVENTORS
JAMES A. LINDLOF
DALE E. WURSTER

ATTORNEYS

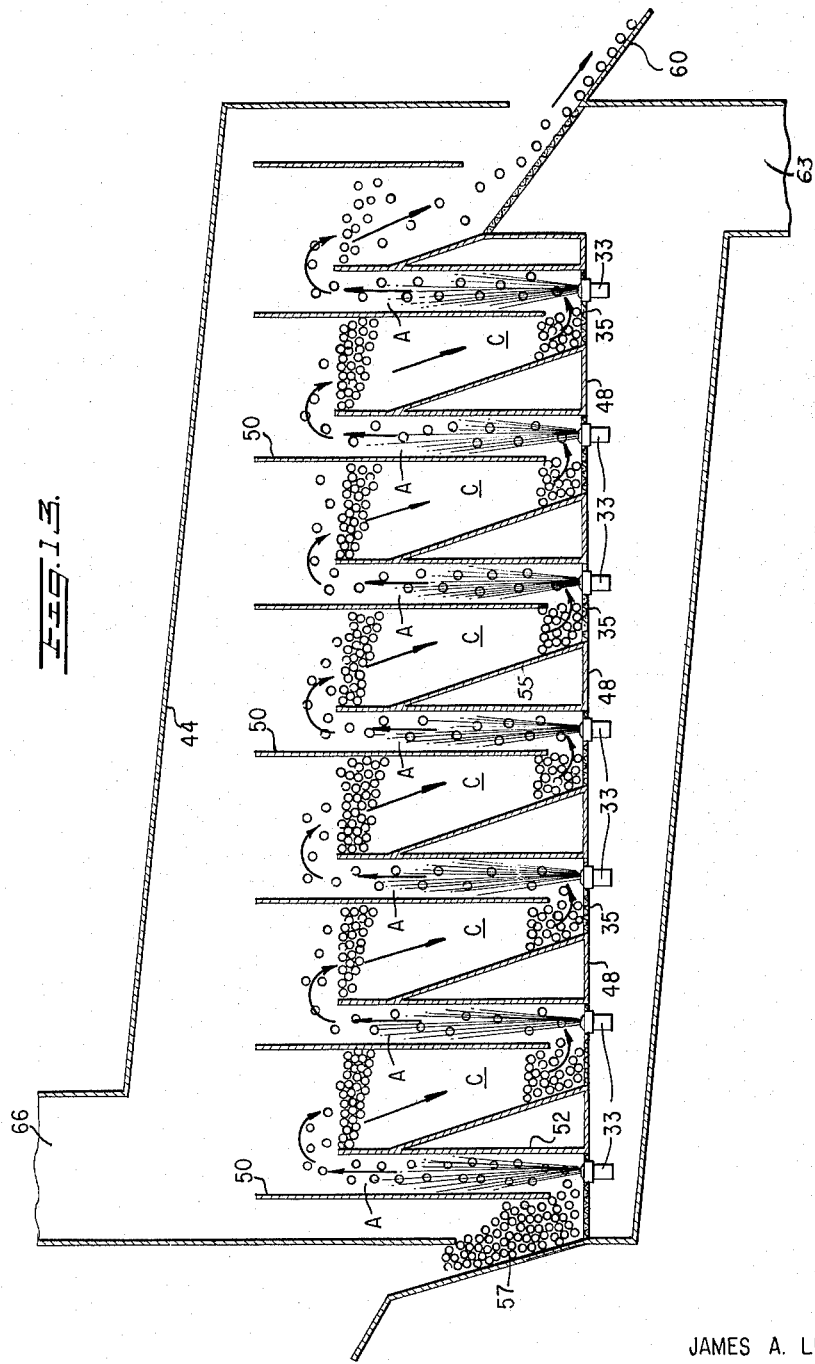

March 22, 1966 D. E. WURSTER ETAL 3,241,520
PARTICLE COATING APPARATUS
Filed Oct. 19, 1964 5 Sheets-Sheet 5
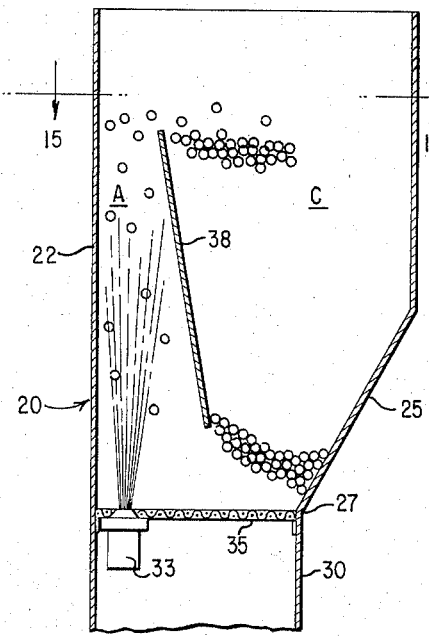
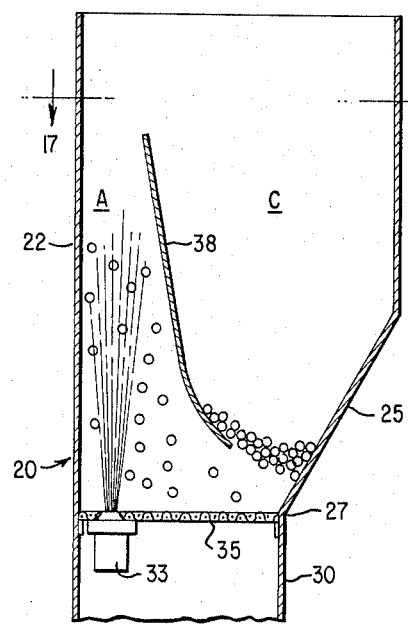
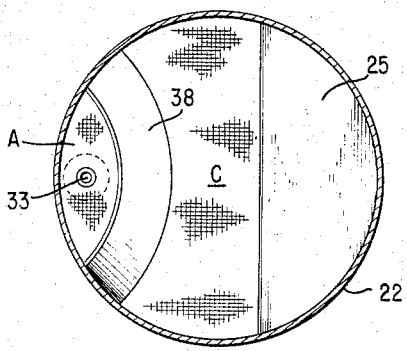
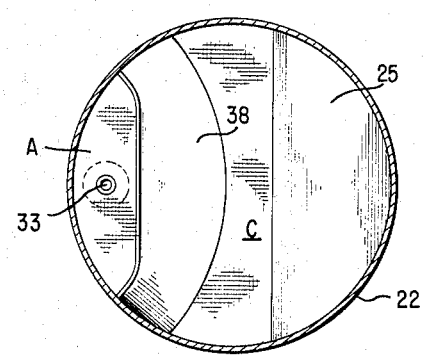
INVENTORS.
JAMES A. LINDLOF
DALE E. WURSTER
BY *Adams, Forward & McLean*
ATTORNEYS.

United States Patent Office 3,241,520
Patented Mar. 22, 1966

3,241,520
PARTICLE COATING APPARATUS
Dale E. Wurster, Madison, Wis., and James A. Lindlof, White Bear Lake, Minn., assignors to Wisconsin Alumni Research Foundation, Madison, Wis., a corporation of Wisconsin
Filed Oct. 19, 1964, Ser. No. 406,215
7 Claims. (Cl. 118—62)

This application is a continuation-in-part of application for U.S. Letters Patent Serial No. 98,078, filed March 24, 1961, now abandoned.

The present invention relates to apparatus for applying coatings to discrete particles.

More particularly, this invention relates to apparatus for applying coatings to discrete particles while the said particles are essentially suspended in a moving gas stream.

A process for coating discrete particles while the particles are held in suspension in a moving gas stream, as well as illustrative apparatus for carrying out such process, are described in the copending application of Dale E. Wurster, Serial No. 861,063, filed December 21, 1959, now abandoned in favor of continuation-in-part application Serial No. 337,481, filed January 13, 1964. In the process of that application the discrete particles which are to be coated are held in suspension by an upwardly flowing gas (e.g. air) stream in a coating chamber to form a bed of gas suspended particles. The coating material, in atomized, or like finely divided form, is introduced into the gas stream prior to its contact with the gas-suspended particles which are to be coated. Moreover, the gas stream is directed into one portion of the suspended bed of particles at a higher velocity than in the remaining portion of the bed to cause the particles to flow upwardly in the portion of the bed subjected to the higher velocity gas stream, thereby inducing a downward flow in the remaining portion of the bed with a resultant vertical cyclical movement of the particles in the bed. The coating material is directed into the upwardly flowing higher velocity gas stream in the lower end of the upwardly flowing portion of the particle bed. Such process has been demonstrated to provide distinct advantages over prior processes wherein the discrete particles were in a "fluidized" bed form, i.e. where all particles are completely suspended in the gas stream and move at random through the bed, and to be satisfactory for many particle coating operations.

It has been found that the process of S.N. 861,063, and which is described above, at times exhibits a tendency to be over-sensitive in that the interrelation between high and low velocity gas stream flows, batch sizes, position of the coating material atomizing means, etc., must be carefully controlled. In addition, it was observed that classification of the discrete particles, when materials having a particle size variation were being coated, and short cycling, i.e. aspiration of particles into the higher velocity upwardly flowing portion of the suspended bed from the other portions of the bed near the top of the higher velocity gas stream, caused some lack of uniformity in the applied coatings. Also, any reduction in the upward flow of gas through the downwardly moving particles in the portions of the particle bed not being subjected to high velocity gas flow can result in the essential isolation of individual particles from the coating action, and the adjustment of the system to account for differences in particle shape and density of particles in the high velocity and lower velocity upwardly moving gas streams was difficult to accomplish.

It is also significant that it was found that the lower velocity gas stream, which flows upwardly through the portion of the particle bed in which the particles are moving downwardly, and which air stream allows the particles to descend in essentially weightless contact, appears to be aspirated from that portion of the bed in which the particles move downwardly, into the high velocity upwardly moving stream of gas suspended particles. Thus, instead of the gas diffusing outwardly from the high velocity gas stream into the remaining portion of the particle bed as was assumed to be the case in the known processes and apparatus, there is actually a movement of gas in the reverse direction which tends to deaerate the portion of the bed in which the particles are moving downwardly.

It is an object of this invention to overcome the aforementioned disadvantages of prior processes in the art and to provide an apparatus and method whereby a controlled cyclic movement of particles can be obtained for coating purposes.

It is a further object to obtain such cyclical particle movement with relatively little random interparticle motion.

It is a still further object to provide apparatus and methods for applying uniformly distributed coatings to discrete particles.

Other objects and advantages will be apparent from the following detailed description.

The foregoing and other objects are accomplished by providing an apparatus for coating discrete particles which comprises in combination a vertically disposed closed chamber having a gas inlet at the bottom of the chamber and a gas outlet at the top of the chamber, and containing a vertically extending partition means, normally impervious to the flow of gas therethrough, which divides the said chamber interiorly into two vertically extending zones in open communication both at the top above the partition and at the bottom below the partition means. A gas distributing means which is co-extensive with the cross-sectional area of the chamber at the locus of the gas distributing means, is spaced below the lower end of the partition means. The gas distributing means is characterized by defining areas of differing volumetric gas-delivering capability and is designed to establish a greater upward velocity of gas in one of the said zones than in the other. The zone in which greater gas velocity is established is the coating zone and the zone having the lesser gas velocity can be termed the subsidence zone. The configuration of the gas distributing means, which may be, for example, a perforated disc of metal or other hard non-resilient material, or appropriate duct work containing control dampers, or screens of varying mesh sizes, is such that when discrete particles are disposed within the chamber and gas is supplied in sufficient amount through the gas-distributing means the particles are carried upwards in substantially non-turbulent flow, i.e. with little random interparticle movement and out of substantial contact with each other, in the coating zone. The high velocity air stream with the entrained particles diffuses outwardly from the coating zone after it has reached the top of the partition means whereby its velocity decreases. The entrained particles pass over the top of the partition means and settle downwardly in substantially weightless contact in the second, or subsidence, zone against the upwardly moving stream of gas in the said subsidence zone.

The configuration of the gas distributing means is further designed so that a volume of gas is delivered to the space which is defined in the chamber by the gas distributing means and a horizontal projection of the bottom of the partition means which is in excess of the amount of gas required to induce incipient fluidization of the bed of discrete particles disposed within the chamber. ("Incipient fluidization" is the point at which particles which are disposed in a bed in a closed chamber through which a gas is being passed upwardly become suspended in the gas stream and gain some freedom to move. See FIG. 1 of Design for Fluidization, Part 1, Chemical Engineering, September 17, 1962 wherein point C can be considered to represent the point of incipient fluidization.) The gas-distributing means, in cooperation with the partition means induces a horizontal gas flow vector in the space under the subsidence zone defined by the gas distributing means and a horizontal projection of the lower end of the partition means, which causes the excess gas in the said space to move horizontally in that space and into the coating zone to combine with the upwardly flowing stream of gas in the coating zone. Thus, discrete particles which are descending in substantially weightless contact, i.e. at the point of incipient fluidization in the subsidence zone are transported by the horizontal air vector under the lower end of the partition means and into the coating zone where they are carried upwardly by the high velocity gas stream for repetitive cycling in the apparatus in accordance with the foregoing description.

Associated with the coating zone is means for directing coating material in finely divided form into the said zone so that the finely divided coating material comes in contact with and adheres to the surface of the individual discrete particles while the said particles are being transported upwardly in the coating zone substantially out of contact with each other to the top of the coating zone, by which time the adhering coating material is substantially dry. These particles then pass into the subsidence zone as hereinbefore described, descend to the bottom of said zone, are swept horizontally above said gas distributing means and under the lower end of said partition means and back into the high velocity air stream in the coating zone to complete a single cycle. This cycle is repeated many times by each individual particle before the desired coating is accomplished.

In operation, as described, the coating zone in the chamber contains a relatively low density of discrete particles, i.e. number of individual particles per cubic unit, while the subsidence zone contains a high density of discrete particles.

As in the coating process of S.N. 861,063, referred to hereinbefore, the present invention accomplishes the coating of a large area of the individual particles to be coated during each pass through the coating zone and essentially prevents agglomeration of the individual particles by maintaining the particles out of contact with each other until the applied coating material has become substantially dry and non-tacky. Moreover, possible smearing and/or attrition of the coating is essentially prevented by maintaining the individual particles in essentially weightless contact in the subsidence zone.

In addition, and over and above the benefits obtained in the process of S.N. 861,063, this invention offers other advantages. For example, it insures uniform distribution of the coating material on the discrete particles since all particles follow essentially the same cyclic path through the apparatus in progression and, hence, receive essentially the same number of coats and the same amount of coating; it permits the speed of the cycling of the particles to be varied, allowing different flow rates of the particles through the coating zone and different drying times to be used—by this means with pharmaceutical tablets, very thin, successive coatings can be applied to achieve maximum surface gloss and minimum tackiness and solvent penetration or thicker successive coats can be applied for maximum resistance to attrition during processing; the gas flow through the particle bed can also be controlled to correlate with the shape and/or density of the particles as a means for minimizing breakage and attrition as well as resistance to the smooth flow of the particles in the apparatus; greater latitude in batch sizes is possible and higher rates of coating material atomization can be used which results in a greater throughput and better coating finishes.

For a more complete understanding of the practical application of the principles of the invention reference is made to the appended drawings which, by way of illustration, show apparatus suitable for carrying out the process of the invention.

In the drawings:

FIGURE 1 is a fragmentary vertical cross-section of the particle holding portion of the apparatus;

FIGURE 2 is a cross-sectional view taken at the line 2—2 of FIGURE 1;

FIGURES 3 and 4 are modifications of the apparatus shown at FIGURE 2;

FIGURE 5 is a fragmentary vertical cross-section of a modification of the apparatus of FIGURE 1;

FIGURE 6 is a cross-sectional view taken along lines 6—6 of FIGURE 5;

FIGURE 7 is a fragmentary vertical cross-section of another modification of the apparatus of FIGURE 1;

FIGURE 8 is a cross-sectional view taken along lines 8—8 of FIGURE 7;

FIGURE 13 is a fragmentary vertical cross-section showing seven units of apparatus in series for carrying out the process of the present invention;

FIGURE 14 is a fragmentary vertical cross-section of another modification of the apparatus of FIGURE 1;

FIGURE 15 is a cross-sectional view taken along the line 15—15 of FIGURE 14;

FIGURE 16 is a fragmentary vertical cross-section of still another modification of the apparatus of FIGURE 1; and FIGURE 17 is a cross-sectional view taken along the line 17—17 of FIGURE 16.

Figure 9:
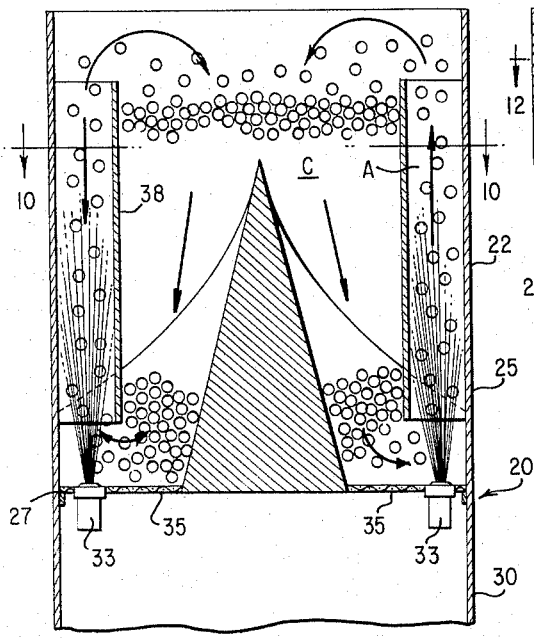
FIGURE 9 is a fragmentary vertical cross-section of a modification of the apparatus of FIGURE 1 showing a plurality of coating zones.
Figure 11:
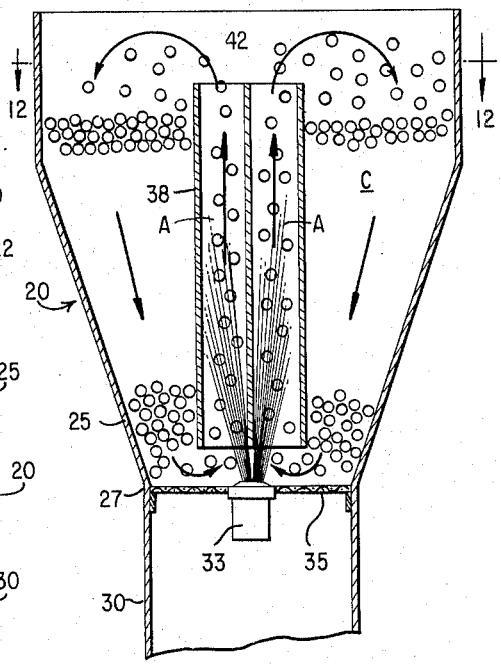
FIGURE 11 is a fragmentary vertical cross-section of another modification of the apparatus of FIGURE 1.
Figure 10:
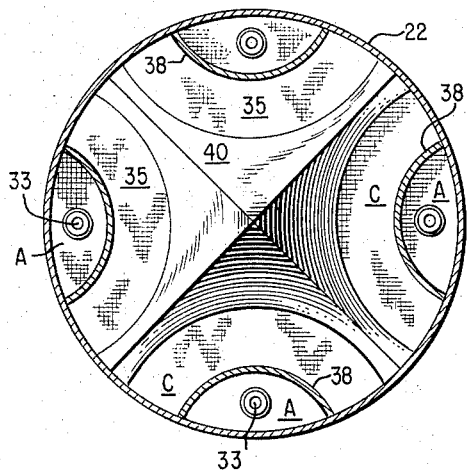
FIGURE 10 is a cross-sectional view taken along line 10—10 of FIGURE 9.
Figure 12:
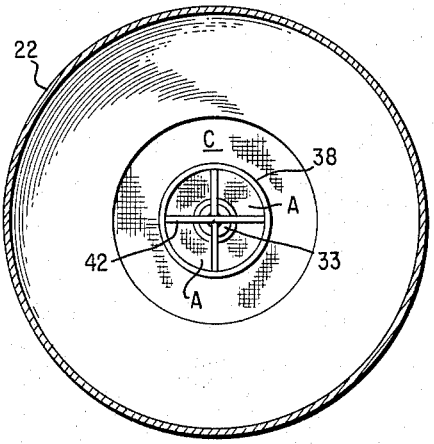
FIGURE 12 is a cross-sectional view taken along lines 12—12 of FIGURE 11.

Arrows are employed in the drawings to show the flow of particles. With the exception of the horizontal air vector in the space defined by the gas distributing means and a projection of the lower end of the partition means, gas flow is primarily upward in all of the apparatus shown.

The apparatus includes a vertically elongated chamber 20 which has generally vertical walls in its upper portion 22. The lower portion 25, of the chamber preferably has walls suitable for defining a cylinder or frustoconical or frustopyramidal zone. If tapered, the walls of this lower section are constructed to gradually and regularly reduce the cross-sectional area of the upper portion to provide an area at the bottom 27, of the lower portion 25, which may be equal to approximately 40–60 percent of the area of upper portion 22. With certain particle shapes and with extremely friable particles, however, it has been found to be advantageous to avoid constriction or crowding in the downward flow of the particles by using chambers of uniform cross-section or chambers with only a small restriction of area at the bottom of the lower section. For such purposes the chamber cross-sectional area at the bottom of the lower section should be about 50–100%, with about 75% to 90% preferred, of the area of the upper section 22 of the chamber. The tapering is preferably accomplished over a height approximately equal to the largest horizontal dimension of the upper portion 22. As shown in FIGURES 2, 3, and 4 the tapered section can have various shapes and contours, such as square, as shown in FIGURE 2, or round as shown in FIGURES 3 and 4.

The chamber 20 is constructed of rigid hard material such as steel or aluminum, or a transparent synthetic resin (e.g. Lucite) or similar material or combinations of these or like materials. At its lower end 27, chamber 20 communicates with gas inlet section 30 which is connected to a gas supply system (not shown) which may include a blower and heat exchange section for controlling gas temperature. Atomizing nozzle 33 which is connected to the coating material supply system (not shown) sprays the coating solution or fluid in finely divided form into the high velocity gas stream to impinge on the particles carried in the said gas stream. The gas inlet section 30 is shown to have the same cross-sectional area as the lower end 27 of chamber 20 at the locus of the gas distributing means 35. This is preferred configuration. The gas stream entering the bottom of the chamber 20 thus has the same cross-sectional area as the bottom of the tower. The gas supply and coating feed material supply systems can be in accordance with the systems shown in the application of Dale E. Wurster, Serial No. 810,128, filed April 30, 1959, now Patent No. 3,089,824. A gas-distributing means 35 is positioned at or near the top of gas inlet nozzle section 30. This means is depicted as a screen having portions of non-uniform mesh size, the entire gas distributing screen being of such mesh size as will prevent the particles from dropping into the inlet duct before or after the coating operation. It is to be understood that gas-distributing means other than a screen can be used, precautions, of course, being taken to prevent particles from falling into the inlet duct through the use of suitable gas-pervious means.

The coating material is supplied to the coating zone in the apparatus through nozzle 33, which is shown in the drawings about level with the screen. It may however be located above or below the screen as desired, but in all cases so that the spray from the nozzle is directed into coating zone A. Chamber 20 is provided with partition 38 which may be made of any of the rigid non-pervious materials described above or other substantially rigid non-pervious materials. This partition separates coating zone A from subsidence zone C.

The partition 38 extends vertically in the chamber 20 from a point just slightly above the gas distributing means 35, say from about 0.5 to 4.0 inches, to a point about even with or slightly above the top of the gas-suspended bed in chamber C. It is preferred that an open space of about 1 to 3 inches be left between the partition and the gas distributing means. The height of the partition is dependent upon the volume of the charge of particles placed in the apparatus for coating. Partition 38, which can be movable or adjustable either at the top or bottom or both, can have any cross-sectional shape, as illustrated in FIGURES 2, 3, and 4, but is generally placed to define a coating zone A having an area equal to about 5–50% of the total cross-sectional area of chamber 20 with about 25% being preferred. In any event, the cross-sectional area of the coating zone A must be less than the cross-sectional area of the bottom of the chamber. Zone A is generally of uniform cross-sectional area throughout its height.

In FIGURES 1–6 the partition is arranged at the side of the chamber 20. In FIGURES 7 and 8 the partition is a tube at about the center of the chamber and this is the configuration which is preferred. In all cases, however, it will be noted that the partition defines a coating zone immediately above the atomizing nozzle 33. FIGURES 9 and 10 show an embodiment of the invention in which a plurality of nozzles 33 are provided at the periphery of the bottom 27 of the lower section 25. Also, in this embodiment a plurality of partitions 38 are employed and the tapered shape is given to subsidence zone C by the generally pyramidal internal wall or pillar 40. Such an arrangement provides a plurality of coating zones A with one subsidence zone C. Further transverse partitions can be installed in this apparatus to separate it into discrete subsidence regions, if desired. The number of atomizing nozzles used for applying the coating material is also discretionary, but would correlate somewhat with the cross-sectional area and, hence, capacity of the apparatus. A plurality of coating zones A may be provided in a large capacity apparatus by employing a single large capacity or multiple spray nozzle in the center of the bottom 27, as in FIGURES 11 and 12, and providing the coating zone with the intersecting weir arrangement 42. This weir arrangement serves to reduce the velocity of the gas and hence reduce the height to which the particles are propelled by the high velocity gas stream flowing upwardly through the coating zone.

FIGURE 13 illustrates an embodiment of this invention in which plural layers of the same or different coatings may be applied to particulate materials by series flow through a plurality of coating and subsidence zones. In this embodiment the housing 44, is provided with the elongated false bottom 48, the partitions 50 which provide for flow of solids under the partition to a subsequent coating zone and with the weirs 52 over which particles flow from a coating zone to a subsidence zone. This embodiment is also preferably provided with walls 55 to give the preferred tapered shape to zones C and may also have the storage and feed hopper 57 and the exit trough 60. By this apparatus the output from each coating stage is fed to the next and the particles will receive a plurality of thin layers of coating corresponding to the number of coating stages. Provision is made, as shown, for introduction of gas, preferably preheated, at 63, and a gas exit is provided at 66. If desired, separate sources of gas can be provided for the various coating sections. Different coating fluids also can be applied in different sections. The principle of the apparatus illustrated in FIGURE 13 can be applied to any logical arrangement of coating sections, such as cylindrical, longitudinal or vertical.

In the embodiment of the invention depicted in FIGURES 14–17 the partition 38 is arranged farther from the side 22 at the bottom than at the top. Such an arrangement provides for control of the velocity at the top of coating zone A, due to the diminishing cross-sectional area of this zone toward the top of the coating apparatus. Also, as shown in FIGURE 16, the partition 38 may be flared outwardly at its bottom, to further guide particles in coating zone A. A rounded partition may also be flattened toward the top of coating zone A, as illustrated in FIGURE 17 for better control of the particle movement.

In operation, a charge of particles is placed in zone C of tower 20 or in hopper 57 of FIGURE 13, and a flow of gas is introduced through conduit 30 or inlet 63 into tower 20 or casing 44. Part of the gas is directed by the gas distributing means into coating zone A at fairly high velocity, carrying particles from the bottom of the bed in zone C and up into coating zone A. The greater velocity of gas in zone A is caused by a number of factors. For example, the dense bed of particles in zone C increases the resistance to upward gas flow through zone C, tending to shunt gas entering the bottom of the bed in zone C over to zone A along with associated particles to be coated. This shunting mechanism, which is also promoted by the cooperation of the gas distributing means and the partition means, induces the horizontal gas vector hereinbefore discussed and which is an essential element in the successful operation of the apparatus. In addition, if an air-atomizing type of spray nozzle is used the velocity of the gas used for atomization is also added to the velocity of gas passing upwardly through coating zone A.

The circulating particles pass upwardly in non-turbulent flow in zone A through the cloud of atomized spray being emitted by nozzle 33. Some of the atomized coating material adheres to the particles and is rapidly surface-dried since the particles are freely suspended substantially out of contact with each other as they are transported upwardly by the gas stream flowing through zone A. The velocity gradient that exists in zone A will tend, through Bernoulli's principle, to keep particles and spray droplets away from the walls and toward the center of zone A and in very limited contact with each other. At the top of partition 38 or 52, the gas stream from zone A will diffuse rapidly over zone C due to the greater cross-sectional area of the chamber at this point. As a result, the air velocity drops to a point where it will no longer transport the particles and they settle out into subsidence zone C. The particles in this zone will move downwardly against the flow of gas passing upwardly through this zone and which is of a velocity to render the descending particles essentially weightless. Near the bottom of the subsidence zone, the velocity of the gas passing upwardly through this zone will be higher and the descending particles will become essentially freely suspended and weightless. These suspended particles will then be aspirated under the partition 38 or 50 into the high velocity upwardly moving gas stream in zone A, along with a portion of the gas which is emitted by gas distributing means 35 under subsidence zone C. Further diffusional drying and hardening of the coating applied to the particles in coating zone A will take place in the subsidence zone C as the particles travel countercurrent to the gas flow in that zone. Also, in zone C, the particles will recover heat energy given off during the drying process.

It will be obvious that certain changes can be made in the foregoing construction without departing from the spirit and scope of this invention. For example, the coating material may be a finely divided solid material, or may be partially in solution and partially in suspension in a suitable solvent, or may be completely dissolved in a suitable solvent. Accordingly it is intended that the foregoing description and accompanying drawings shall be interpreted as illustrative and not in a limiting sense.

Having thus described the invention what is claimed is:

1. An apparatus for applying coatings to discrete particles comprising in combination means defining a closed chamber, a gas inlet means at the bottom of said chamber and a gas outlet means at the top of said chamber, vertically extending partition means within said chamber whereby said chamber is divided into two vertically extending zones openly communicating with each other at their upper ends above said partition means and at their lower ends below said partition means, gas distributing means spaced below the lower end of said partition means and coextensive with the cross-sectional area of said chamber at the locus of the said gas distributing means, for directing a gaseous medium upwardly into the lower end of each of the said two vertically extending zones, said gas distributing means being characterized by defining areas of positive and differing volumeric gas delivering capability to establish a greater upward velocity of gas in the first of said zones than in the second of said zones whereby, when discrete particles are disposed within said chamber, the particles are carried upwardly in non-turbulent flow in the first of said zones over said partition means and settle downwardly in substantially weightless contact in the second of said zones, and to direct a volume of gas into the space defined by the said gas distributing means and a horizontal projection of the bottom end of said partition means in excess of that volume of gas which is required to induce incipient fluidization of the particles in said chamber, the said gas distributing means in cooperation with said partition means inducing a horizontal gas flow vector in the space under the second of said zones defined by the gas distributing means and a horizontal projection of the lower end of the partition means, whereby the said excess gas in the said space under the said second zone moves horizontally in said space and into said first zone to combine with the upwardly flowing gas in said first zone and thereby transports particles descending in substantially weightless contact in said second zone from said second zone under the lower end of said partition means and into said first zone, and means positioned to atomize a coating material into said first zone.

2. The apparatus of claim 1 in which the horizontal cross-sectional area of the first zone is from about 5% to about 50% of the horizontal cross-sectional area of the closed chamber.

3. The apparatus of claim 1 in which the partition means consists of a non-gas-pervious wall extending transversely across said closed chamber.

4. The apparatus of claim 1 in which the partition means is cylindrical in form and is positioned centrally in the said closed chamber, the first zone being the interior of the said cylinder and the second zone being disposed peripherally about said cylindrical partition means.

5. The apparatus of claim 4 in which the horizontal cross-sectional area of the first zone is about 25% of the horizontal cross-sectional area of the closed chamber.

6. The apparatus of claim 5 wherein the gas distributing means is a rigid perforated metal plate.

7. The apparatus of claim 6 wherein the horizontal cross-sectional area of the said closed chamber and the horizontal cross-sectional area of the gas-distributing plate are equal.

References Cited by the Examiner

UNITED STATES PATENTS

| | | | |
|---|---|---|---|
| 2,118,078 | 5/1938 | Flugel | 34—10 |
| 2,343,780 | 3/1944 | Lewis | 34—57 X |
| 2,451,391 | 10/1948 | Keck | 118—62 |
| 2,487,370 | 11/1949 | Putney | 34—10 |
| 2,550,722 | 5/1951 | Rollman | 34—10 X |
| 2,561,395 | 7/1951 | Marshall | 117—100 X |
| 2,768,095 | 10/1956 | Tadema et al. | 117—100 |
| 2,786,280 | 3/1957 | Gishler et al. | 34—10 |
| 2,797,908 | 7/1957 | Zubrzycki | 34—57 X |
| 3,003,752 | 10/1961 | Frost | 34—57 X |
| 3,020,227 | 2/1962 | Nevens et al. | |
| 3,112,220 | 11/1963 | Heiser et al. | 118—303 X |

DANIEL BLUM, *Primary Examiner.*

RICHARD D. NEVIUS, *Examiner.*